United States Patent [19]

Kilpper et al.

[11] Patent Number: 5,342,950
[45] Date of Patent: Aug. 30, 1994

[54] PREPARATION OF QUINOPHTHALONE DERIVATIVES

[75] Inventors: Gerhard Kilpper, Carlsberg; Helmut Hoch, Weisenheim, both of Fed. Rep. of Germany

[73] Assignee: BASF Aktiengesellschaft, Ludwigshafen, Fed. Rep. of Germany

[21] Appl. No.: 835,986

[22] PCT Filed: Nov. 28, 1990

[86] PCT No.: PCT/EP90/02036

§ 371 Date: Feb. 27, 1992

§ 102(e) Date: Feb. 27, 1992

[87] PCT Pub. No.: WO91/08264

PCT Pub. Date: Jun. 13, 1991

[30] Foreign Application Priority Data

Dec. 6, 1989 [DE] Fed. Rep. of Germany ....... 3940348

[51] Int. Cl.$^5$ .......................................... C07D 215/06
[52] U.S. Cl. ............................................ 546/171
[58] Field of Search ................................ 546/171, 173

[56] References Cited

U.S. PATENT DOCUMENTS

| 1,963,374 | 6/1934 | Ogilvie | 546/173 |
| 3,108,109 | 10/1963 | Clarke | 546/173 |
| 3,639,405 | 2/1972 | Walker | 546/154 |

FOREIGN PATENT DOCUMENTS 2638528 3/1977 Fed. Rep. of Germany .

OTHER PUBLICATIONS

Chimia, Band 24, Sep. 1970, Sauerlander AG Verlag, (Aarau, CH), B. K. Manukian et al.: "Chinophthalone", Seiten 328–339.

Primary Examiner—Marianne M. Cintins
Assistant Examiner—Phyllis Spivack
Attorney, Agent, or Firm—Oblon, Spivak, McClelland, Maier & Neustadt

[57] ABSTRACT

Quinophthalone derivatives of the formula I

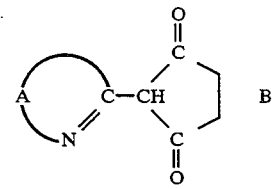

where the group A completes substituted or unsubstituted heteroaromatic rings and the group B completes a substituted or unsubstituted aromatic ring, are prepared by reacting a methyl-substituted heterocyclic compound of the formula II

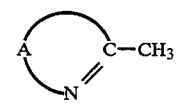

with an anhydride of an aromatic dicarboxylic acid of the formula III

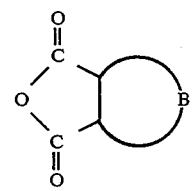

or the corresponding free dicarboxylic acid (IIIa) in the presence of an acid and of an organic solvent, the organic solvent used being an alkyl benzoate.

4 Claims, No Drawings

PREPARATION OF QUINOPHTHALONE DERIVATIVES

The present invention relates to an improved process for preparing quinophthalone derivatives of the formula I

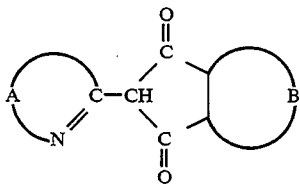

where the group A completes substituted or unsubstituted heteroaromatic rings and the group B completes a substituted or unsubstituted aromatic ring, by reacting a methyl-substituted heterocyclic compound of the formula II

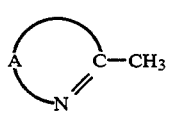

with an anhydride of an aromatic dicarboxylic acid of the formula III

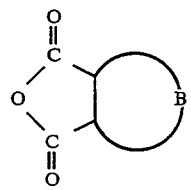

or the corresponding free dicarboxylic acid (IIIa) in the presence of an acid and of an organic solvent.

As will be known, the quinophthalone derivatives I are yellow dyes. They are prepared by reacting 2-methylquinoline derivatives or other heterocycles which contain an activated 2-methyl group with aromatic o-dicarboxylic acids or anhydrides—heretofor in the presence of inert high-boiling solvents such as o-dichlorobenzene (U.S. Pat. No. 1,963,374), trichlorobenzene (Helv. Chim. Acta 50 (1967), 2200) or nitrobenzene (J. Org. Chem. 23 (1958), 373).

The reaction in phenol as solvent in the presence or absence of acidic condensing aids such as iron chloride, copper halides or phenolates of inorganic bases is described in DE-A-24 35 097.

However, these solvents not only are physiologically unsafe but also have various technical and ecological disadvantages.

It is an object of the present invention to use more suitable solvents.

We have found that this object is achieved by a process for preparing the above-defined quinophthalone derivatives I by reacting a methyl-substituted heterocyclic compound II with an anhydride III of an aromatic dicarboxylic acid or with the corresponding free dicarboxylic acid IIIa in the presence of an acid and of an organic solvent, which comprises using an alkyl benzoate as organic solvent.

With the alkyl benzoates to be used according to the present invention the nature of the alkyl moiety is basically immaterial, provided the alkyl benzoate in question is liquid under reaction conditions, as will usually be the case for esters having alkyl moieties of up to 6 carbon atoms. Esters of higher alkanols, for example those of from 6 to 12 carbon atoms, generally require superatmospheric conditions.

Suitable alkyl benzoates are accordingly propyl benzoate, isopropyl benzoate, butyl benzoate and isobutyl benzoate, but ethyl benzoate is preferable, and particularly good results are obtained with methyl benzoate.

The alkyl benzoate is conveniently used in the form of the crude, technical-grade ester, because the impurities present therein, for example methyl p-methylbenzoate, do not interfere.

The amount of alkyl benzoate is not critical and therefore may be varied within a wide range. The general range is from 3 to 20 times, preferably from 4 to 12 times, the weight of the starting compound II.

Suitable acids for the condensation reaction are the customary inorganic acids such as boric acid and preferably organic acids. Suitable organic acids are in particular aliphatic $C_1$-$C_{12}$-carboxylic acids, preferably $C_1$-$C_3$-carboxylic acids, araliphatic carboxylic acids, preferably phenylacetic acid, and aromatic carboxylic acids such as toluic acid and preferably benzoic acid.

Advantageously, the acid is used in an amount of from 0.001 to 1 mol, preferably from 0.01 to 0.8 mol, per mole of heterocycle II.

The starting compounds II and III or IIIa are known or obtainable by known methods.

Having regard to the dyes I, preferred starting materials II are 2-methylpyridine, 2-methylbenzimidazole, 2-methylbenzothiazole, 2-methyl-4-quinazolone and very particularly preferably 8-aminoquinaldine.

If the starting compound II still contains free amino groups as substituents, they likewise react with the starting compounds III to form imides. Particularly important dyes of this kind, e.g. Pigment Yellow 138, are derived from 8-aminoquinaldine.

Suitable starting compounds III are phthalic anhydride, pyromellitic anhydride, naphthalic anhydride, tetrabromophthalic anhydride and very particularly preferably tetrachlorophthalic anhydride.

Having regard to a high space-time yield it is advisable to use an excess of from about 10 to 100 mol % of anhydride III, based on the amount of heterocycle II.

Turning now to the process itself, the general procedure is to add the components II and III/IIIa and the acid to the alkyl benzoate and to heat the solution to the reaction temperature while distilling off the water of condensation.

As a rule, the reaction is carried out within the range from 100° to 200° C., preferably at the boiling point of the ester.

Advantageously, the reaction is carried out under atmospheric pressure, but it may also be carried out at from 1 to 10 bar, preferably at from 1 to 5 bar.

The reaction time is customarily from 1 to 10, usually from 1 to 6, hours.

An economically very advantageous embodiment of the process of the present invention involves using water-containing starting materials and subsequently removing the water from the solution azeotropically during the heating-up.

The reaction mixture is worked up in a conventional manner, to be precise diluted with a watermiscible solvent, e.g. methanol or ethanol, at below 100° C. and then filtered at from room temperature to elevated temperature, particularly preferably by direct filtration of the solution at from 50° to 110° C.

The quinophthalone derivative I is isolated in a conventional manner by washing the filter residue with the solvent or water and, if necessary, drying.

After the dyes have been separated off, it is advisable to purify the solvent occasionally by distillation, which makes it possible to recover more than 95% of the ester.

The remainder can be left for bacterial degradation in the wastewater and be removed from the exhaust air by scrubbing with an alkali, for example sodium hydroxide solution.

The quinophthalone derivatives produced by the process of the invention are used as pigment dyes for printing inks, as coating pigments and for the spin dyeing and mass coloration of thermoplastic materials such as polystyrene, polyvinyl chloride, polyamides, polyesters, polyacrylonitrile, cellulose triacetate and cellulose acetate.

The process of the invention represents an advance in the art in that it is technically simple and gives good yields and a purity so high that in its as-prepared state the product is directly suitable for finishing as a dye or pigment.

EXAMPLE

Preparation of 2-(1-hydroxy-4,5,6,7-tetrachloroindan-3-on-2-yl)-8-(tetrachlorophthalimido)quinoline (Pigment Yellow 138)

A solution of

| A solution of |
| --- |
| 300 g of methyl benzoate |
| 26.4 g of 8-aminoquinaldine |
| 144.4 g of tetrachlorophthalic anhydride and |
| 15 g of benzoic acid | was heated to 180° C. in the course of 2 hours. During the condensation reaction which took place in that period the water of reaction was distilled off. The reaction mixture was then maintained at 180° C. for 5 hours.

A customary workup by crystallization and washing of the crystals with methyl benzoate, methanol and water gave the quinophthalone derivative in a yield of 112 g (=97% of theory, based on 8-aminoquinaldine).

We claim:

1. A process for preparing quinophthalone derivatives of the formula I

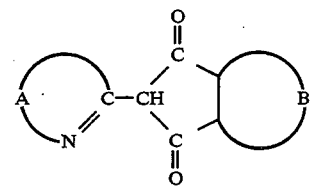

wherein the group A completes substituted or unsubstituted heteroaromatic rings and the group B completes a substituted or unsubstituted aromatic ring, by reacting a methyl-substituted heterocyclic compound of the formula II

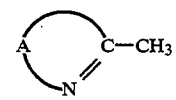

with an anhydride of an aromatic dicarboxylic acid of the formula III

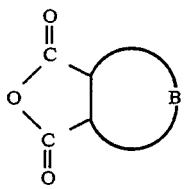

or the corresponding free dicarboxylic acid (IIIa) in the presence of an acid selected from the group consisting of an inorganic acid, an aliphatic $C_{1-12}$ carboxylic acid, phenylacetic acid, toluic acid and benzoic acid and of the organic solvent, which comprises using an alkyl benzoate as the organic solvent in an amount from 3 to 20 times the weight of said methyl-substituted heterocyclic compound II.

2. A process as claimed in claim 1, wherein the alkyl benzoate used is methyl benzoate.

3. The process according to claim 1, wherein said substituted or unsubstituted heteroaromatic ring is selected from the group consisting of 2-methylpyridine, 2-methylbenzimidazole, 2-methylbenzothiazole, 2-methyl-4quinazolone, and 8-aminoquinaldine.

4. The process according to claim 1, wherein the anhydride of an aromatic dicarboxylic acid is selected from the group consisting of phthalic anhydride, pyromettilic anhydride, naphthalic anhydride, tetrabromophthalic anhydride, and tetrachlorophthalic anhydride.

* * * * *